United States Patent [19]
Koivu

[11] Patent Number: 5,737,359
[45] Date of Patent: Apr. 7, 1998

[54] METHOD FOR SUPERVISING BASE STATION RADIO CHANNELS

[75] Inventor: Vesa Koivu, Oulu, Finland

[73] Assignee: Nokia Telecommunications Oy, Espoo, Finland

[21] Appl. No.: 436,184
[22] PCT Filed: Sep. 12, 1994
[86] PCT No.: PCT/FI94/00399
    § 371 Date: May 10, 1995
    § 102(e) Date: May 10, 1995
[87] PCT Pub. No.: WO95/08246
    PCT Pub. Date: Mar. 23, 1995

[30] Foreign Application Priority Data

Sep. 14, 1993 [FI] Finland ................ 934019
Feb. 15, 1994 [FI] Finland ................ 940705

[51] Int. Cl.⁶ .................................. H04Q 7/38
[52] U.S. Cl. ............... 375/202; 375/227; 370/321; 370/333; 455/67.3; 455/226.1; 455/424
[58] Field of Search .................... 375/200, 202, 375/203, 260, 264, 286, 224, 227; 370/18, 19, 57, 84, 95.1, 69.1, 321, 333, 337, 347, 442; 455/63, 67.1, 67.3, 67.4, 226.1, 226.2, 226.3, 423–425; 379/59, 60

[56] References Cited

U.S. PATENT DOCUMENTS

| 5,157,709 | 10/1992 | Ohteru ................ 455/63 |
| 5,161,253 | 11/1992 | Hirano . | |
| 5,323,447 | 6/1994 | Gillis et al. ................ 379/61 |
| 5,375,123 | 12/1994 | Andersson et al. ................ 370/95.1 |
| 5,377,221 | 12/1994 | Mundat et al. ................ 455/63 |
| 5,428,602 | 6/1995 | Kemppainen ................ 375/202 |
| 5,475,869 | 12/1995 | Gomi et al. ................ 455/63 |
| 5,487,185 | 1/1996 | Halonen ................ 455/67.1 |
| 5,526,398 | 6/1996 | Okada et al. ................ 379/57 |

FOREIGN PATENT DOCUMENTS

| 450382 | 10/1991 | European Pat. Off. . |
| 3246907 | 6/1984 | Germany . |
| 3513361 | 10/1986 | Germany . |
| 4215422 | 11/1992 | Germany . |
| 2254971 | 10/1982 | United Kingdom . |
| 2173376 | 10/1996 | United Kingdom . |
| 93 15568 | 8/1993 | WIPO . |
| 93 16567 | 8/1993 | WIPO . |
| 94 932 | 1/1994 | WIPO . |

OTHER PUBLICATIONS

Patent Abstracts of Japan, vol. 12, No. 397, E–672, abstract of JP.A.63–138824, Jun. 10, 1988.

Primary Examiner—Stephen Chin
Assistant Examiner—Amanda T. Le
Attorney, Agent, or Firm—Pillsbury Madison & Sutro LLP

[57] ABSTRACT

A method for supervising base station radio channels to detect channels with interference and/or poor quality, by measuring and analysing connections separately for each radio channel. For instance, radio channels with poor quality and/or interference in the frequency hopping sequence can be detected, eliminated from the frequency hopping sequence, and replaced by others, while the poor quality and/or interference remains a problem.

6 Claims, 1 Drawing Sheet

METHOD FOR SUPERVISING BASE STATION RADIO CHANNELS

BACKGROUND OF THE INVENTION

This invention relates to a method for supervising base station radio channels by means of interference measurement. The invention relates further to a method for supervising base station radio channels by measuring the quality of a received signal.

One of the most critical factors in radio systems, for example in cellular mobile telephone systems, is the quality of the radio connection between the base station and a mobile station. The quality of this radio connection is influenced substantially by the condition of the radio parts, i.e. the antennas and the transceivers, of the base station. Therefore, the condition of the radio parts of the base station is supervised by means of various measurements and tests. Another factor influencing the quality of the radio connection is radio-frequency interference occurring in radio channels, resulting from, for example, other radio devices or base stations.

Therefore, the specifications of the PanEuropean GSM mobile radio system, for instance, require a base station to supervise the quality of received signals during normal traffic operation, for example by calculating the bit error rate (BER) on the basis of a signal obtained from the output of the receiver of the base station. Moreover, the base station is required to measure continuously the interference level of a radio channel in all non-active dedicated channels, i.e. both in signalling and traffic channels. At the moment, the interference level of the radio path is measured at the base station separately for each connection, whereupon the base station transmits information of the interference level of each free signalling or traffic connection to other parts of the system, for example to the base station controller (BSC), at predetermined intervals. The problem with the present measuring technique is that even though disturbances in the radio path usually vary greatly as a function of frequency, a measuring method of the present type cannot give any information about this "interference distribution" between different radio channels, especially if the base station uses frequency hopping. Frequency hopping refers to operation where the transmitting frequency and correspondingly the receiving frequency at the receiving end are continuously changed during a connection by using a suitable number of frequencies and a predetermined frequency hopping sequence. The use of frequency hopping yields two different advantages, namely frequency diversity and interference diversity. Frequency diversity improves the quality of a radio connection mainly when a transmitter and a receiver move slowly in relation to each other. If the frequency of a radio connection in a time division multiple access (TDMA) system is changed enough from one channel time slot to another, the fading situations imposed on different time slots do not correlate. The interference diversity effect is based on the fact that the frequency hopping sequences of base stations using the same or adjacent frequencies are different or at least are phased in relation to each other, and therefore the frequencies interfering with each other also change on transition from one time slot to another, and the effect of strong sources of interference is distributed among several connections, whereupon the effect of the interference on a single connection decreases. However, this only accentuates further the aforementioned problem that the present techniques of interference measurement do not provide information about the distribution of interference between different radio channels.

SUMMARY OF THE INVENTION

One aim of the present invention is to eliminate the above problem. This aim is achieved by means of a method according to the invention which is characterized in that the interference level of a control or traffic channel hopping from one radio channel to another during a connection is measured separately for each used radio channel, and the measured interference levels are stored separately for each radio channel, that the interference levels of each radio channel measured during a predetermined period of time are analyzed, and that a disturbed radio channel is detected on the basis of the analysis.

In practicing the method of the invention, a base station measures the interference level of each radio channel and determines the distribution of interference between different radio channels by analysing the interference levels of each radio channel measured during a predetermined period of time. On the basis of the analysis, it is possible to detect strongly disturbed radio channels. In a preferred embodiment of the invention, the analysis comprises calculating, for each radio channel, the average of the interference level values measured during a predetermined period of time. The base station reports the results of the measuring for instance to the operation and maintenance centre of the radio system. On the basis of the measurement results of each radio channel, it is possible to detect a disturbed radio channel and the source/s of interference and to utilize this information for example in the reconfiguration of the network to eliminate the interference.

Another aim of the present invention is to improve the quality of a radio connection. This aim is achieved by means of a method according to the invention which is characterized in that the received signal quality of a control or traffic channel hopping from one radio channel to another during a connection is measured separately for each used radio channel, and the measured values are stored separately for each radio channel, that the signals measured during a predetermined period of time are analyzed separately for each radio channel, and that a radio channel of poor quality is detected on the basis of the analysis.

By means of this embodiment according to the invention, radio channels weakening the quality of a connection can be detected during an ongoing call, after which the base station can take the required steps to improve the quality of the connection.

In a preferred embodiment according to the invention, a radio channel detected to be of poor quality is discarded, preferably by replacing it in the frequency hopping sequence with another radio channel. Moreover, since the quality of the radio channels is supervised separately for each connection, the quality of a single connection can be improved by means of the method according to the invention by changing the frequency hopping sequence used by the connection in question so that the radio channel of poor quality is no longer used for the particular connection.

BRIEF DESCRIPTION OF THE DRAWING

The invention will be described in the following in Greater detail by means of illustrative embodiments and with reference to the accompanying drawing, in which.

DETAILED DESCRIPTION

The method and the transceiver unit according to the present invention are applicable at least in all time division multiple access (TDMA) systems. These include the Pan-European mobile communication system GSM and its direct modifications, such as the Digital Communication System DCS1800. In the following, the GSM system will be used as an example. The ETSI/GSM Recommendations and The GSM SFstem for Mobile Communications (by M.Mouly and M-B. Pautet, Palaiseau, France, 1992, ISBN:2-9507190-0-7) are referred to for a more detailed description of the GSM system.

The GSM system follows the frequency division multiple access (FDMA) principle, according to which there are a number of radio channels (carrier frequencies) in use in the system. In the radio channels on the other hand, time division multiplexing is applied on the TDMA principle so that each radio channel comprises several, typically 8, TDMA time slots. The time slots are mainly used to transmit control channels (CCH) and traffic channels (TCH). In the traffic channels, speech and data are transmitted. Signalling between the base station and mobile subscriber stations takes place in the control channels.

Figure 1:
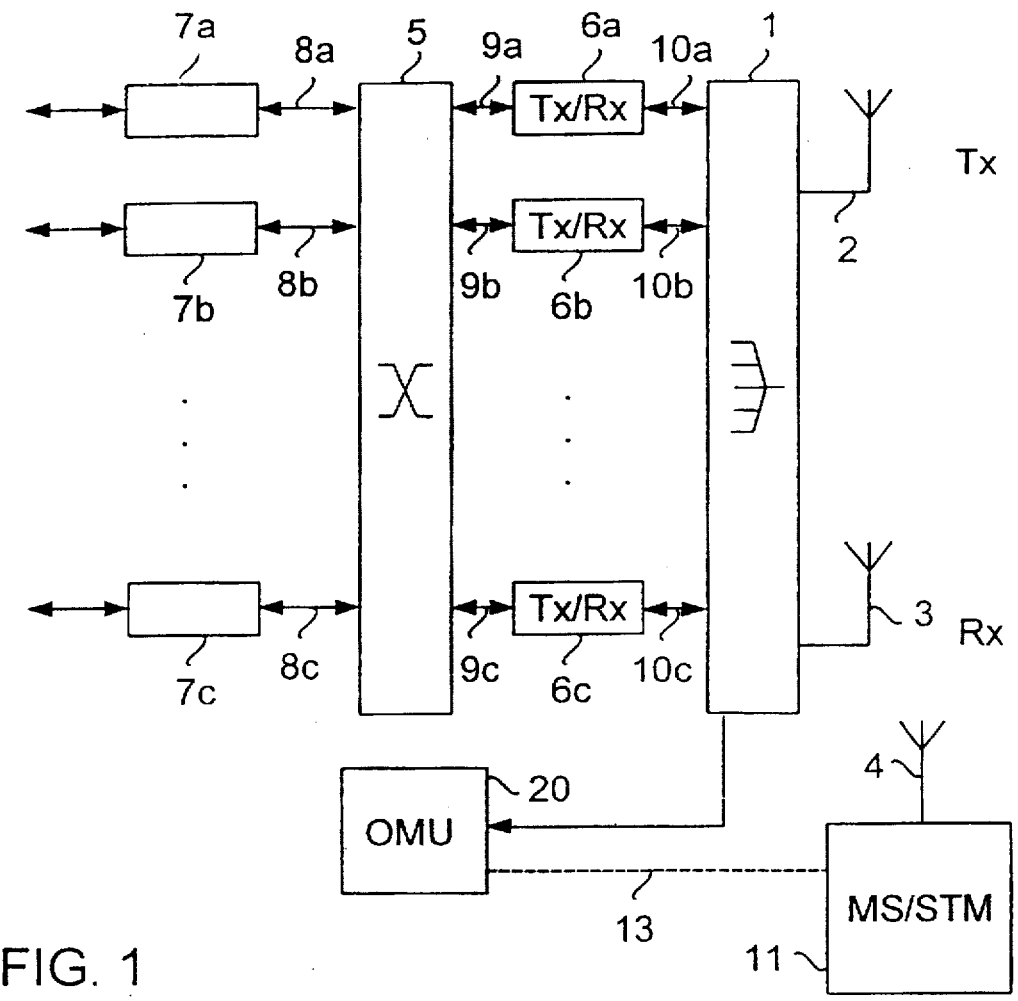
FIG. 1 is a block diagram of a base station according to the invention.

FIG. 1 shows a block diagram of a base station according to the invention. The base station comprises preferably at least two transceiver units 6a, 6b and 6c. In the GSM system each transceiver is of full-duplex type, and the duplex spacing between the transmitting and receiving frequencies of the transceiver is 45 MHz. The frequency range used by the system varies preferably between 800 and 1,000 MHz. The transceivers 6a to 6c have fixed transmitting and receiving frequencies which differ from each other. The outputs 10a to 10c of the transceivers 6a to 6c are connected to the radio-frequency combining and branching unit 1, which connects the transmitters of the transceivers 6a to 6c to a common transmitting antenna 2 (by means of combiner filters) and the receivers to a common receiving antenna 3 (by means of a branching equipment). There can be alternatively two receiving antennas, if diversity reception is used. The radio-frequency combining unit 1 comprises a band-pass-type transmitting filter for the transmitter of each unit 6a. The filter has been manually or automatically tuned to the transmitting frequency of the transmitter. Correspondingly, the combining unit 1 comprises a receiving filter which limits the signal coming from the antenna to the receiving band, and a division amplifier that amplifies the signal and divides it to all receivers.

A base station shown in FIG. 1 further comprises several carrier-frequency frame units 7a, 7b and 7c, which form the carrier-frequency modulation signals for the transceiver units 6a to 6c and which handle the signals that the transceivers have received and converted to the carrier frequency. In the frame units 7, user data and control data to be transmitted is placed in TDMA frames, channel-coded and interleaved, after which it is modulated in the transmitting unit into a TDMA burst onto the desired transmitting carrier. Correspondingly, the frame unit 7 performs demodulation, de-interleaving, channel decoding and deframing on the received signals.

Between the transceiver units 6a to 6c and the frame units 7a to 7c there is a cross-point-type switching matrix 5, which connects the outbound carrier-frequency signals generated in the frame units 7 to each of the transceivers 6a to 6c in turn, according to a predetermined frequency hopping sequence, so that the signal of a specific frame unit 7 hops from one transmitting frequency to another. Correspondingly, the switching matrix 5 connects signals which the transceivers have received and converted, to the carrier frequency to the frame units 7a to 7c, according to a predetermined frequency mapping sequence. Alternatively, the frequency hopping may be realized by connecting each frame unit directly to a dedicated transceiver, the frequency of which is changed according to the frequency hopping sequence (cf. FIG. 2).

The operation of the base station is controlled by the operation and maintenance unit 20 (OMU) of the base station. The OMU 20 is also used as a measuring unit, which receives a radio-frequency signal from the branching equipment and measures the level of the received signal. Alternatively, the receivers Rx may comprise measuring equipment, which measures the received signal level and forwards the result of the measuring to the OMU 20. The base station may also have an associated special testing means STM which simulates the subscriber equipment and which is denoted generally by reference numeral 11. The MS/STM 11 can be under the direct control of the base station (broken line 13) so that the OMU 20 controls the testing operations. The MS/STM 11 can, for example transmit a known test signal via the radio path, the level of the signal being measured at the base station.

In the case shown in FIG. 1, the base station measures the interference level in free, non-active traffic and control channels. A free and non-active channel means that the base station does not transmit or receive any payload signal on that particular channel. Thus, all radio-frequency energy measured on that channel is interference energy. According to the invention, a measuring unit situated in the OMU 20 or in the channel unit 6 measures, separately for each radio channel, the interference levels of radio-frequency interference signals or bursts received from the antenna on the channel. The OMU20 calculates radio-channel-specific averages from interference level values measured during a predetermined period of time, after which the calculated averages are transmitted from the base station for example to the operation and maintenance centre (OMC) of the radio system. If, for example, the base station uses radio channels 0, 12, 22 and 38, it transmits at predetermined intervals a report of the measurement, which reads:

interference level on channel 0=X
interference level on channel 12=Y
interference level on channel 22=Z
interference level on channel 38=N.

On the basis of the average interference levels measured on each radio channel, it is possible to detect a disturbed channel the average interference level of which is clearly higher than that of other radio channels. After this, the channel with the high level of interference can be discarded, if necessary, by changing the frequency hopping sequence used by the switching matrix, for example by replacing in the frequency hopping sequence a channel unit tuned to the disturbed channel with another, previously unused, channel unit which is tuned to another frequency channel.

Figure 2:
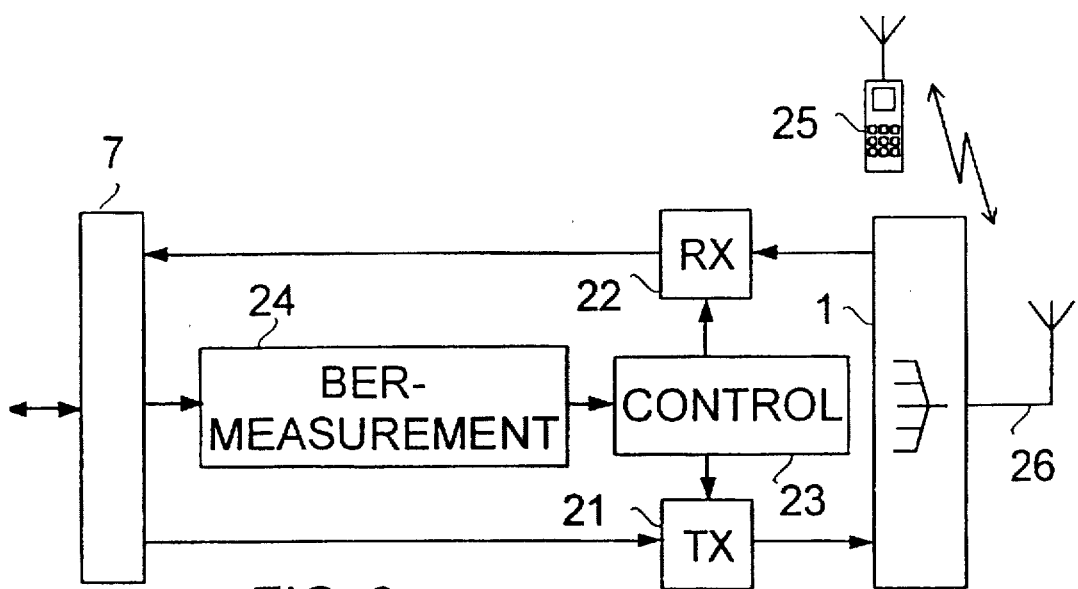
FIG. 2 is a block diagram of a transceiver unit according to the invention.

FIG. 2 shows a block diagram of a transceiver unit according to the invention. The unit in question is a transceiver unit placed in a base station of the GSM system and communicating with a mobile radio unit 25 by means of a combined transmitting and receiving antenna 26. The combining and branching unit 1 connects the transmitter 21 and the receiver 22 to the antenna 26. Other transceiver units (not shown in FIG. 2) in the base station are also connected to the antenna 26 by means of the combining unit 1.

The transceiver unit shown in FIG. 2 deviates from the transceiver units shown in FIG. 1 in that the frequency hopping is realized in a different way. The transmitter 21 and the receiver 22 shown in FIG. 2 are not permanently tuned to a particular frequency channel as in the case of FIG. 1, where the frequency hopping is realized by means of the switching matrix 5. In the case of FIG. 2, the transmitter 21 and the receiver 22 are connected directly to the frame unit 7, and the frequency hopping is realized by means of a control unit 23, so that, before each outbound burst, the control unit changes the radio channel of the transmitter 21 and the receiver 22 according to a predetermined frequency hopping sequence.

A measuring unit 24 measures and calculates the bit error rate of the received radio-frequency signals separately for each frequency channel and each connection, i.e. separately for each frequency channel used by a particular connection, on the basis of signals obtained from the input of the receiver 22, after the frame unit 7 has disassembled the frame units. Thus, the measuring unit .24 calculates the frequency-channel-specific averages of the bit error rates calculated for the connection during a predetermined period of time, after which the calculated averages are fed into the control unit 23 separately for each frequency channel and each connection of the transceiver unit.

When the control unit 23 has detected, in the aforementioned manner, a connection-specific disturbed frequency channel, it notifies the radio unit 25 of the elimination of one or more channels and/or of their replacement with another frequency channel starting from a given frame. If the disturbed channel is eliminated, the connection between the transceiver unit and the radio unit 25 continues on the remaining frequency channels. An indication of the change in the frequency hopping sequence is transmitted to the radio unit 25 by means of, for instance, the fast associated control channel (FACCH) of the GSM system.

The control unit places the discarded frequency channels under supervision. This takes place, according to the invention, in such a way that the radio unit 25 transmits test bursts on the discarded frequency channels, on a frequency channel placed under supervision, to the transceiver units during the empty frames described in the GSM specifications. On the basis of the measuring results obtained from the test bursts, a discarded frequency channel can be brought back into use by adding it to the frequency hopping sequence of the transceiver in the same way as it was removed.

It must be understood that the above description and the accompanying figures are only meant to illustrate the present invention. Different variations and modifications of the invention will be evident to those skilled in the art without departing from the scope and the spirit of the invention disclosed in the appended claims.

I claim:

1. A method for supervising base station radio channels in a mobile communication system where the radio channels are divided into logical channels on a TDMA-principle, by measuring the quality of signals received on a plurality of said radio channels during a plurality of connections utilizing said radio channels, comprising the steps of:

separately measuring during said connections the received signal quality of the logical channels hopping from one radio channel to another for each of the radio channels used in a frequency hopping sequences, to obtain respective measured values of received signal quality;

storing separately the measured values of each radio channel used;

analyzing separately for each radio channel used by said connections the respective measured values of received signal quality for signals measured during a predetermined period of time; and detecting that a radio channel has poor quality on the basis of said analyzing.

2. A method according to claim 1, in which:

the quality of the signals is measured for control or traffic channels by calculating the bit error rate separately for each used radio channel; and said analyzing comprises calculating the average bit error rate of each radio channel used by each of said connections during said predetermined period of time.

3. A method according to claim 1, further including:

discarding a detected radio channel having poor quality and replacing the discarded radio channel in said frequency hopping sequences of control or traffic channels with another radio channel.

4. A method for supervising base station radio channels in a mobile communication system where the radio channels are divided into logical channels on a TDMA-principle, by measuring the quality of signals received on a plurality of said radio channels during a plurality of connections comprising the steps of:

separately measuring for a plurality of connections during said connections the received signal quality of control or traffic channels hopping from one radio channel to another for each of a plurality of radio channels used in frequency hopping sequences of said control or traffic channels, to obtain respective measured values of received signal quality;

storing separately for each of said control or traffic channels the measured values for each radio channel used by said control or traffic channels;

analyzing separately for each radio channel used the averages of the received signal quality; and detecting that a radio channel has poor quality on the basis of said analyzing.

5. A method according to claim 4, further including:

discarding a detected radio channel having poor quality and replacing the discarded radio channel in said frequency hopping sequences of said control or traffic channels, with another radio channel.

6. A method for supervising base station radio channels in a mobile communication system where the radio channels are divided into logical channels on a TDMA-principle, by measuring the quality of signals received on a plurality of said radio channels during a plurality of connections utilizing said radio channels, comprising the steps of:

separately measuring during said connections the received signal quality of control or traffic channels hopping from one radio channel to another for each of the radio channels used in frequency hopping sequences, to obtain respective measured values of received signal quality;

storing separately the measured values for each radio channel used;

analyzing separately for each radio channel used by said connections the respective measured values of received signal quality for signals measured during a predetermined period of time;

detecting that a radio channel has poor quality on the basis of said analyzing; and discarding a detected radio channel having poor quality and replacing the discarded radio channel in said frequency hopping sequences of said control or traffic channels, with another radio channel.

* * * * *